Patented Mar. 11, 1930

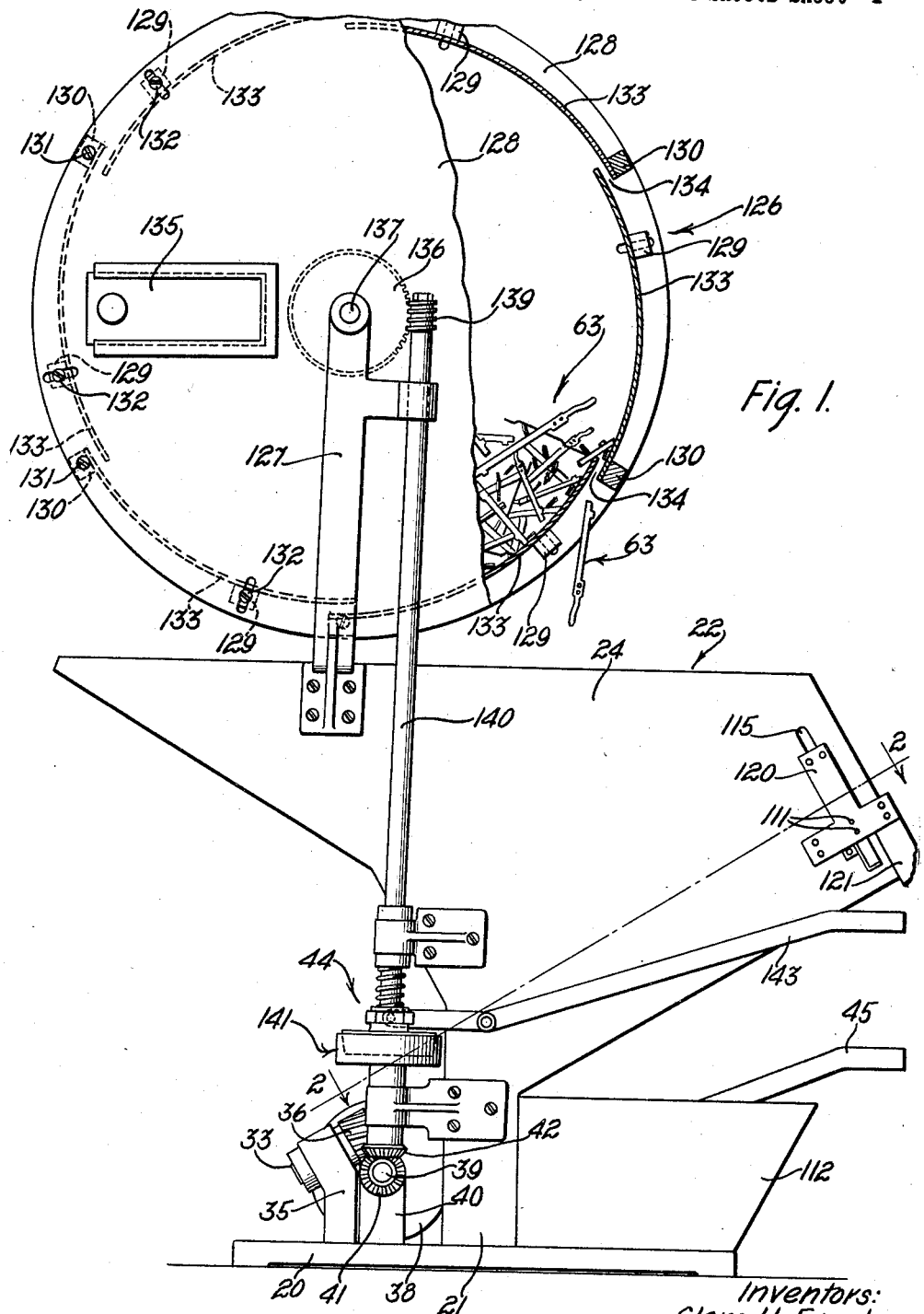

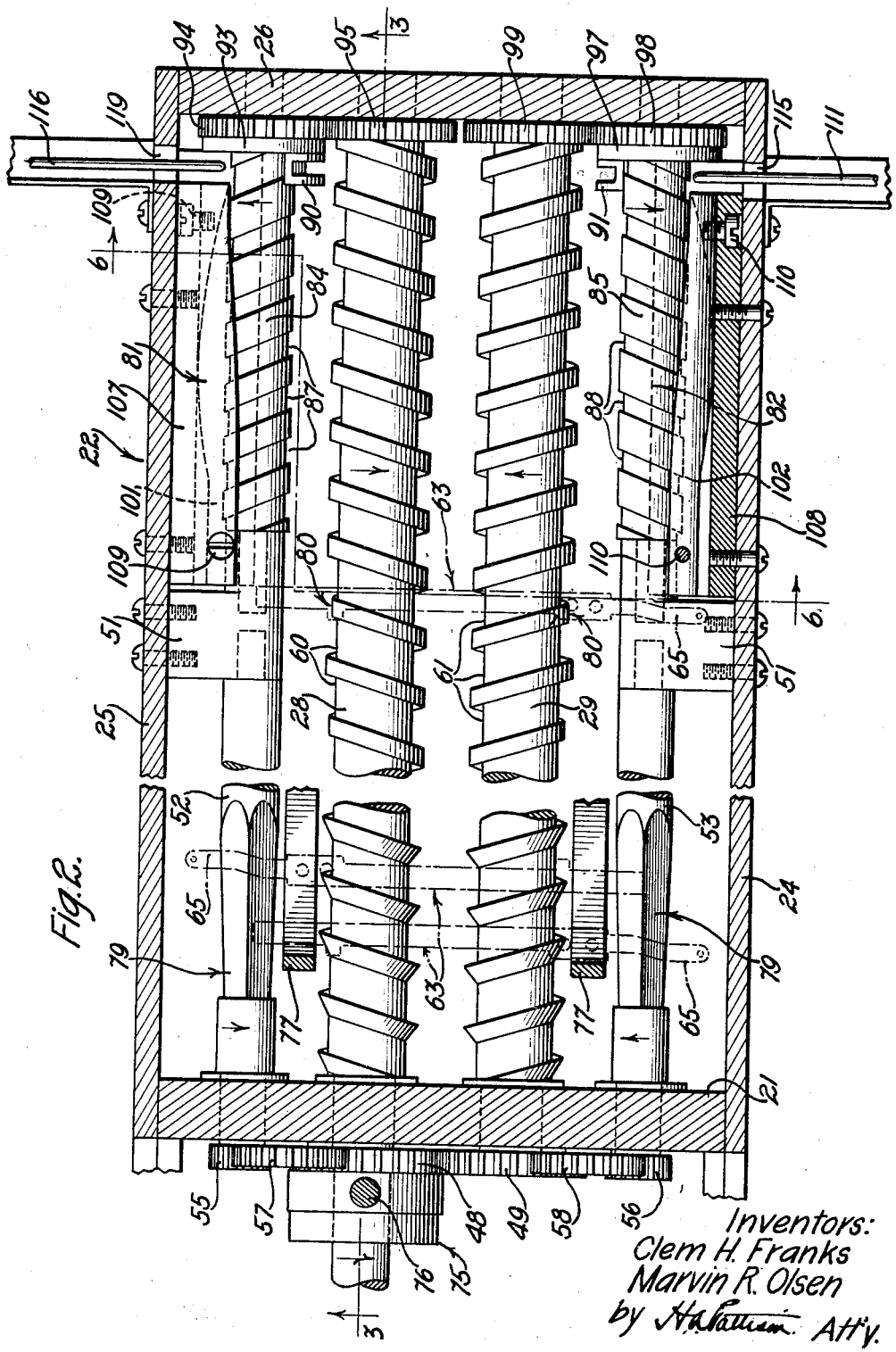

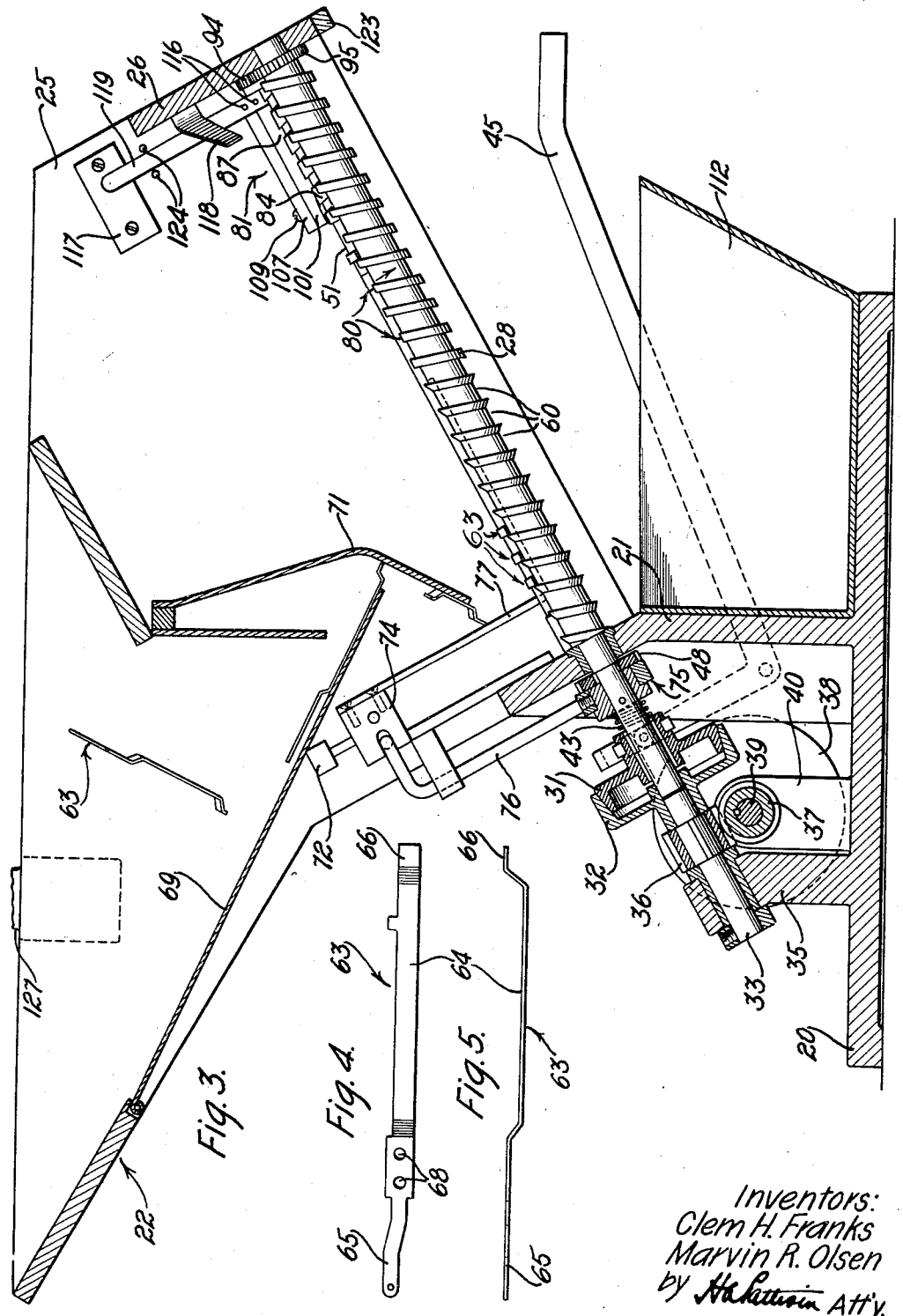

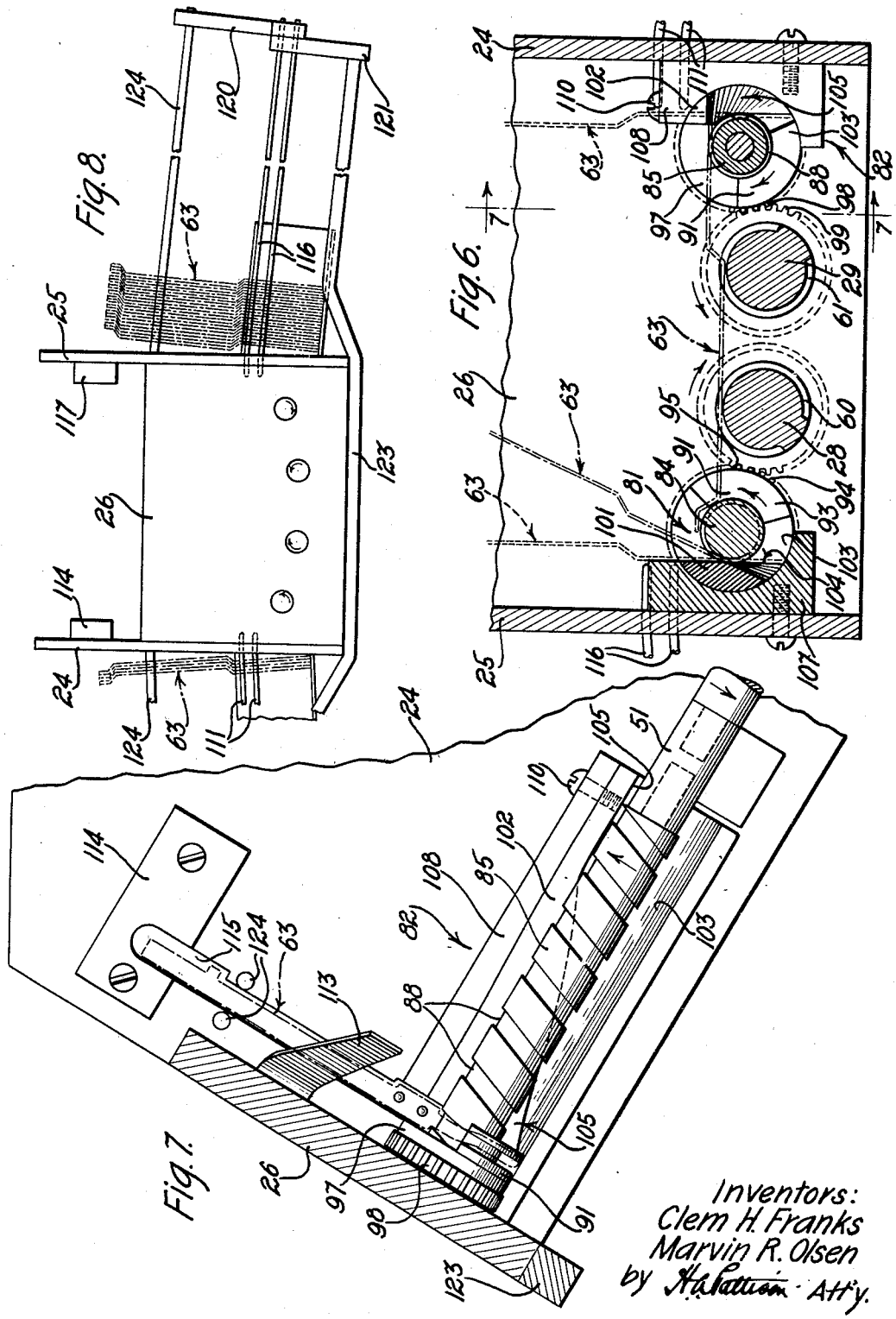

1,750,315

UNITED STATES PATENT OFFICE

CLEM H. FRANKS, OF LA GRANGE, AND MARVIN ROY OLSEN, OF GLEN ELLYN, ILLINOIS, ASSIGNORS TO WESTERN ELECTRIC COMPANY, INCORPORATED, OF NEW YORK, N. Y., A CORPORATION OF NEW YORK

APPARATUS FOR ARRANGING ARTICLES

Application filed June 16, 1926, Serial No. 116,493. Renewed November 8, 1929.

This invention relates to apparatus for arranging articles, and more particularly to apparatus for arranging articles in predetermined positions for assembly purposes.

It is in some instances a customary shop practice in arranging and assembling articles for workers to manually select individual articles from an indiscriminately arranged supply thereof and subsequently arrange the selected articles in proper predetermined position for assembly purposes. Thus, for example in the art of manufacturing electromagnetic switching devices frequently designated as relays which are used extensively in telephone systems and the like, peculiarly shaped electrical terminal members must be selected from a supply thereof and fitted to companion relay parts. It has heretofore been the practice in some instances for the worker to select individually these peculiarly shaped terminal parts from an indiscriminately arranged supply thereof for the purpose of subsequently fitting or assembling them with other companion relay parts.

Objects of this invention are to provide simple and efficient apparatus for advancing articles and for arranging them in proper predetermined positions.

In oder to attain these and other objects and in accordance with the general features of the invention, one embodiment of the invention includes a screw mechanism comprising a pair of parallel screw members inclined from the horizontal and rotatably mounted at their ends. These screws are provided with ways designed to receive and advance terminal members which are indiscriminately associated therewith from a rotatable hopper. Means is provided for properly positioning associated terminal members transversely of the spiral ways and the rotation of the screws in opposite direction causes the positioned members to be advanced. Adjacent each screw member, a second screw mechanism is provided, having spiral ways which engage the adjacent ends of advanced terminal members and cause the orientation and the disassociation thereof from the first mentioned screw mechanism. The second mentioned screw mechanism also advances the disassociated terminal member to a predetermined position and a cam mechanism associated therewith delivers the positioned member to a receiver or magazine. Continued operation of the apparatus causes a plurality of members to be rapidly stacked within the magazine in a manner which renders the members readily adaptable for subsequent assembly purposes.

These and other objects and features of the invention will be more readily understood from the following detailed description when considered with the accompanying drawings, in which—

Fig. 1 is a side elevational view of an arranging apparatus representing one embodiment of the invention, the rotatable hopper thereof being shown partly in section;

Fig. 2 is a fragmentary plan sectional view of the screw mechanisms taken on the line 2—2 of Fig. 1;

Fig. 3 is a longitudinal vertical sectional view of the apparatus taken on the line 3—3 of Fig. 2;

Figs. 4 and 5 are detailed elevational views of a relay terminal member adapted to be arranged by the apparatus;

Fig. 6 is a transverse sectional view of the screw mechanisms taken on the line 6—6 of Fig. 2;

Fig. 7 is a detailed sectional view of the upper end of one of the screw mechanisms taken on the line 7—7 of Fig. 6, and Fig. 8 is a fragmentary elevational view of the delivery end of the apparatus.

Referring now to the drawings wherein like numerals have been used to designate similar parts throughout the various disclosures, it will be understood that the improved arranging apparatus includes a base 20 which has a frame portion 21 integral therewith and extending upwardly therefrom (Figs. 1 and 3). Suitably secured to the upper end of the base frame 21 at the sides thereof is a housing indicated generally by the numeral 22 which includes a pair of vertical side walls 24 and 25 which are secured to and extend upwardly from the base frame. The lower edges of these walls 24 and 25 are inclined upwardly from the base frame 21 and an end plate 26 is interposed between and secured to these side walls at a position which will be hereinafter mentioned as the delivery end of the apparatus. Journaled between the end plate 26 and the upper end of the base frame 21 are a pair of spaced parallel screw members 28 and 29 (Figs. 2 and 3) which are inclined from the horizontal and are parallel to the lower edges of the side walls 24 and 25.

The screw member 28 is rotatably mounted within and extends through the base frame 21 and supports a slidably mounted friction clutch member 31 at its lower extremity (Fig. 3). This clutch member 31 is designed for operative engagement with a companion clutch member 32 which is secured to a stub shaft 33 in axial alignment with the screw member 28 and revolubly mounted at its lower portion within an upright bracket member 35 formed integral with the base 20. Secured to the stub shaft 33 adjacent to the bracket 35 is a helical gear 36 which engages with a companion helical gear 37 mounted upon a shaft 39 journaled between supports 40. This shaft 39 is connected at one end by means of a drive pulley 38 with a suitable driving means (not shown), the opposite end thereof being provided with a bevel gear 41 (Fig. 1) which meshes with a companion bevel gear 42 which forms a part of a hopper driving mechanism 44, later to be described. The clutch member 31 is yieldingly held in its normal engaged position with the clutch member 32 by means of a coil spring 43 (Fig. 3) and is adapted to be moved out of association with the clutch member 32 by means of an actuating lever 45 pivotally mounted on the side of the base frame 21.

Rotation is imparted to the screw member 28 during the engagement of the clutch members 31 and 32 and a gear 48 (Fig. 2) mounted upon the screw member 28 adjacent the base frame 21 drives a similar companion gear 49 mounted upon the screw member 29. It will be apparent that these screw members are rotated in opposite direction as indicated by the directional arrows with the upper surfaces thereof moving inwardly. Adjacent to and parallel with each of the screw members 28 and 29 and journaled between bearing blocks 51 secured to the side walls of the housing 22 and the base frame 21 are specially formed rotatable shafts 52 and 53, respectively. The lower extremities of these shafts 52 and 53 carry gears 55 and 56, respectively (Fig. 2), the gear 55 being connected with the gear 48 by an idler gear 57 and the gear 56 being connected with the gear 49 by an idler gear 58. Attention is directed to the fact that these shafts are positioned above spiral ways 60 and 61 formed in the screw members 28 and 29, respectively (Fig. 6), and the reasons for this arrangement will be more apparent as the description progresses.

Terminal members denoted generally by the numeral 63 and as disclosed in detail in Figs. 4 and 5 are adapted to be received and arranged by the screw members 28 and 29. Each of these terminal members 63 comprises a depressed body portion 64 and tips 65 and 66 disposed at opposite ends thereof, the tip 65 being larger than the tip 66 and provided with a pair of apertures 68. When a terminal member 63 is dropped within the housing 22 as is clearly shown in Fig. 3, it will be deposited upon an inclined hinged plate 69. The inclination of the plate 69 is sufficient to cause the deposited terminal member to slide downwardly thereon until it engages the lower portion of a depending baffle plate 71. An opening between the lower free extremity of the plate 69 and the side of the baffle plate 71 permits this terminal member to fall downwardly therethrough when it has assumed a substantially transverse position with respect to the plate 69. To facilitate the sliding of a deposited terminal member downwardly upon the plate 69 and to insure its subsequent transverse arrangement after engaging the baffle plate 71, the plate 69 is continuously vibrated through the action of an oscillatory head 72 engaging with the underside of the hinged plate. This head 72 is secured to the upper surface of a pivotally mounted block 74 which is operatively connected to an eccentric mechanism 75 on the screw member 28 by means of a connecting rod 76. Secured to the side of the block 74 is a pair of depending L-shaped agitator arms 77 and it will be clear that when a terminal member 63 is carried over the lower edge of the hinged plate 69, it will be carried by gravity into engagement and transverse position with respect to these arms 77. Oppositely positioned portions of the ways 60 and 61 of the screw members 28 and 29, respectively, are adapted to receive and advance the terminal member as it is deposited transversely thereon as shown by the dot and dash lines in Fig. 2.

A terminal member 63 is normally or properly positioned upon the screw members 28 and 29 when its depressed body portion 64 is lodged within the ways 60 and 61 and its oppositely disposed tips 65 and 66 are resting upon either of the shafts 52 or 53, depending upon the position in which it was deposited. In this connection it will be observed that the shafts 52 and 53 are formed with a tapered square portion 79 and by this arrangement a deposited terminal member is effectively urged inwardly away from the shafts 52 and 53 by reason of the intermittent frictional engagement or thrust of the sharp edges between the tapered surfaces 79 with the underside of the tips 65. The lower portions of the agitator arms 77 extend parallel with the screw members and are adapted to agitate the terminal members deposited thereon and thereby effect the proper positioning of terminal members which may be deposited in an improper position. For example, if a terminal member should be deposited upon the screw members 28 and 29 with its tips 65 and 66 resting upon either of the shafts 52 or 53, but with its depressed body portion 64 not lodged within aligned spiral ways 60 and 61, the agitator arms will strike the deposited member sufficiently to cause it to orient itself into proper position with the body portion 64 thereof properly lodged within the spiral ways. Having been properly lodged within the spiral ways 60 and 61 the terminal member 63 is then advanced upwardly toward the delivery end of the apparatus during the continued rotation of the screw members 28 and 29. To positively prevent the advancement of more than a single terminal member lodged within oppositely positioned portions of the ways 60 and 61, a portion of the land or surface of the screw members 28 and 29 between the spiral ways, as indicated at 80 (Figs. 2 and 3) is cut away. By this construction, a terminal member, superimposed upon another advancing member, is carried rearwardly by gravity upon reaching the cut away portions of the screw members 28 and 29.

As terminal members 63 are advanced by the ways in the screw members 28 and 29 toward the delivery end of the machine, the tips 65 of the terminal members are carried into association with one of a pair of similar screw mechanisms 81 and 82, depending upon the position in which the terminal member was initially deposited and positioned upon the screw members. The screw mechanisms 81 and 82 each include a screw member 84 and 85 in alignment with the shafts 52 and 53, respectively, and rotatably mounted between their respective bearing blocks 51 and the end plate 26. These screw members 84 and 85 are formed with spiral grooves or ways 87 and 88, respectively, and the upper end of each screw member is provided, respectively, with a segmental cam 90 and 91. The upper extremity of the screw member 84 is provided with a disk 93 adjacent to the cam 90 and a gear 94 which engages with a companion gear 95 carried at the upper extremity of the screw member 28. Likewise the screw member 85 is provided with a disk 97 and a gear 98 which meshes with a companion gear 99 secured upon the screw member 29. Extending along one side of the screw members 84 and 85 are fixed cam members 101 and 102, respectively, provided with specially formed spiral cam surfaces 104 and 105 (Fig. 6). These cam members 101 and 102 are secured in position within a semi-cylindrical recess 103 provided in retaining blocks 107 and 108 (Fig. 6) suitably secured to the side walls 25 and 24, respectively. The cam members 101 and 102 are secured within their companion retaining blocks by means of screws 109 and 110. A receiving tray 112 upon the base 20 is positioned beneath the screw members 28 and 29 and serves to receive terminal members which may be displaced from said screw members.

Referring to Figs. 2 and 6 it will be noted that a terminal member 63 (dot and dash lines) is shown in position with its tip 65 resting upon the bearing block 51 adjacent to the lower extremity of the cam member 102. As the screw members 28 and 29 continue to advance the above mentioned terminal member, its tip 65 will be carried beneath the cam surface 105, which, at its lower extremity, lies in a plane immediately above and parallel with the plane of the upper surface of the advancing tip 65. Immediately subsequent to its being carried beneath the cam surface 105 the tip 65 will be moved into association with the spiral way 88 of the screw member 85, at which point the curvature of the cam surface 105 of the cam member 102 causes the terminal member to be fulcrumed upon the bottom surface of the spiral way 88 and thereby experience an upward swing or tilt away from the screw members 28 and 29. As the terminal member continues to be advanced by the way 88, it will be swung further away from its original horizontal position and upon reaching the upper extremity of the screw member 85, it will swing through an angle of 90° into a position parallel with the side wall 24 as shown by the dotted line in Fig. 6 with the extremity of the tip 65 resting upon the lowermost surface of the cylindrical recess 103 of retaining block 108. Upon reaching this position the segmental cam 91 is carried into engagement with the tip 65 with the result that the terminal member is delivered to the tips of a pair of receiving rods 111 which register with the apertures 68 of the delivered terminal member. As terminal members continue to be advanced by the screw members 28 and 29 and subsequently disassociated therefrom by means of the screw mechanism 82, they are formed in composite or stacked relation upon the receiving rods 111 as shown by the dot and dash lines (Fig. 8). Referring to Fig. 7 it will be observed that an angular guide strip 113 is secured to and extends inwardly from the end plate 26 and serves to guide each terminal member as it is being moved to its final position in parallelism with the side wall 24 by the screw mechanism 82. A guide block 114 secured to the side wall 24 serves also as a guide for the upper extremity of the positioned terminal member and an elongated opening 115 in the side wall permits the passage of delivered terminal members therethrough.

When a terminal member 63 is properly positioned upon the screw members 28 and 29 with its tip 65 resting upon the shaft 52, this tip 65 will be carried into association with the screw mechanism 81. The functional or operative characteristics of the screw mechanism 81 are similar to those which have heretofore been described in connection with the functioning of the screw mechanism 82. It will be noted, however, that the spiral way 87 formed in the screw member 84 is larger at the lower end of the screw member 84 to permit of a loose fit of a tip 65 lodged therein and is reduced in width as it approaches the cam 90 and immediately adjacent the cam 90 the way is again widened. The spiral way 87 is specially formed in the above described manner to accommodate the particular type of terminal member 63 which, it will be noted, is formed with a bend or jog in its tip 65. By reducing the width of the spiral ways 87 to the approximate width of the tips 65 and thereby allowing a minimum side clearance, the terminal member 63 is gripped in a positive position as it approaches the segmental cam 90. This construction is not needed in the screw member 85 because the bend in the tips 65 in the terminal members causes them to normally assume a perpendicular position with respect to the screw member 85, regardless of the fact that said tips 65 may fit loosely in the way 88 thereof. It will be further understood that if the tips 65 were straight, the ways 87 and 88 might be similar in design and uniform in size. The widening of the way 87 at the cam 90 serves to release the terminal member lodged in said way and permits the cam 90 to subsequently deliver the advanced terminal member to receiver rods 116 in the manner heretofore described in connection with the delivery of the members to the receiver rods 111. A guide block 117 (Figs. 3 and 8) similar to the guide block 114 and secured to the side wall 25 serves to guide the upper extremity of a delivered terminal member and a guide strip 118 similar to the guide strip 113 also serves to facilitate the positioning of an advancing terminal member. An elongated opening 119 in the side wall 25, similar to the opening 115, permits the passage of terminal members through the wall as they are delivered in composite order upon the receiver rods 116.

The receiver rods 111 and 116 extend outwardly and are inclined downwardly from their respective side walls 24 and 25 (Fig. 8) and are secured at their outer extremities to T-heads 120 detachably mounted upon blocks 121 carried at the outer extremities of a cross bar 123. Parallel rods 124 extending between the T-heads 120 and the side walls 24 and 25 provide a lateral guide for the remaining members stacked upon the receiver rods 111 and 116.

A rotatable cylindrical hopper 126 (Fig. 1) is mounted between the upper ends of a pair of upright brackets 127 secured to the side walls of the housing 22. This hopper 126 includes a pair of end plates 128 which are separated by means of a plurality of spaced cross bars 130 extending therebetween and pivotally secured at their ends to the end plates by means of screws 131. Secured to each of these cross bars 130 is an arcuate plate member 133 and the free end of each of the arcuate members overlaps the fixed end of an adjacent arcuate member so as to present a slit 134. Each arcuate member 133 carries a pair of blocks 129, which are secured thereto, adjacent the end plates 128. Adjusting screws 132 extend through companion slots in the end plates and are threaded into the blocks 129 and it will be clear that the relative positions of the free ends of the arcuate members may be adjusted in accordance with the required width of the slit 134. By this construction the slit 134 between the free end of the arcuate members 133 and the member adjacent thereto may be adjusted in accordance with the size and the types of parts placed within the hopper. One of the end plates 128 is provided with a slidable door 135 to permit the terminal parts to be readily placed within the hopper and a worm wheel 136 secured to a shaft 137 upon which the hopper 126 is mounted, meshes with a worm 139 secured to the upper end of a vertical drive shaft 140. The hopper drive mechanism 44 is positioned at the lower extremity of the vertical shaft 140 and includes a friction clutch mechanism 141 which is designed to operatively connect the shaft 140 with the bevel gear 42 which meshes with its companion driving bevel gear 41. The clutch mechanism 141 may be rendered ineffective by the manipulation of an actuating lever 143 pivotally mounted upon the side wall 24. During the operation of the apparatus the hopper 126 is slowly rotated by means of the driving mechanism just described and some of the terminal parts which have been indiscriminately placed within the hopper will be carried by gravity through the slit 134 and subsequently deposited upon the hinged plate 69 within the housing 22. A hopper of this construction permits the size of the slit 134 to be adjusted in accordance with the type of part contained within the hopper and also in accordance with the speed with which the parts are desired to be fed into the housing 22.

In the operation of the machine the hopper 136 is provided with a supply of terminal parts 63 and rotation is imparted to the driving pulley 38 from any suitable source of power supply. The terminal parts intermittently fall through the slits 134 of the hopper to the hinged plate 69 within the housing 22 and are subsequently delivered to and transversely of the screw members 28 and 29. The terminal parts thus delivered to the screw members become lodged within oppositely positioned spiral ways 60 and 61 and in the event that a terminal member is delivered in improper position upon the screw members 28 and 29, the agitator arms 77 serve to orient the terminal member so as to positively effect the proper positioning thereof. The terminal parts may be received by the screw members 28 and 29 with the tips 65 of the terminal members engaging with either of the rotatable shafts 52 or 53 and depending upon their relative position upon the screw members, the tips 65 of the advancing terminal members will be carried into association with their respective screw mechanisms 81 and 82. These screw mechanisms 81 and 82 receive the tips 65 of the advanced terminal members and cause the members to be fulcrumed about the screw members 84 and 85 and thereby swung through an angle of 90° from their initial horizontal positions traversing the screw members 28 and 29 to a position at the delivery end of the apparatus in parallelism with the side walls of the housing 22. At this stage of the operation cam members 90 and 91 operate to deliver the positioned terminal members to their respective receiver rods 111 and 116 in a composite group. After a sufficient number of terminal parts have been delivered to the receiver rods, these rods may be removed and another pair placed in position to receive another supply of terminal members.

Although the invention as herein illustrated and described is particularly well adapted for use in connection with apparatus for arranging terminal parts, it should be understood that the novel features of the invention are capable of other applications and should be limited only by the scope of the appended claims.

What is claimed is:

1. In an apparatus for arranging articles, a screw mechanism for arranging an article associated therewith, a cam, and rotary means cooperating therewith for disassociating the article from the screw mechanism and for rearranging the disassociated article in a predetermined position.

2. In an apparatus for arranging articles, a screw mechanism for advancing an article associated therewith, a member adapted to engage an advancing article, and rotary means cooperating with the member for disassociating the article from the screw mechanism and for arranging the disassociated article in a predetermined position.

3. In an apparatus for arranging an article, a screw mechanism for positioning and advancing articles indiscriminately associated therewith, a stationary cam for engaging an advancing article, and rotary means cooperating therewith for disassociating an article from the screw mechanism and for arranging the disassociated article in a predetermined position.

4. In an apparatus for arranging an article, a screw mechanism for arranging an article associated therewith, a receiving means, a member positioned to engage a properly arranged article, and rotary means cooperating with the member for disassociating the article from the screw mechanism and for delivering the disassociated article to the receiving means.

5. In an apparatus for arranging articles, a screw mechanism for arranging articles associated therewith, a member having a cam surface, and a second screw mechanism cooperating with said cam surface for disassociating articles from the first mentioned screw mechanism and for arranging the disassociated articles in a predetermined position.

6. In an apparatus for arranging articles, a mechanism having a spiral way for advancing an article associated therewith, a member having a cam surface for engaging an advancing article, and a second mechanism having a spiral way cooperating with said cam surface for disassociating an article from the first mentioned mechanism.

7. In an apparatus for arranging articles, a mechanism having a spiral way for advancing an article associated therewith, a cam for engaging an advancing article, and a second mechanism having a spiral way cooperating with said cam for disassociating an article from the first mentioned mechanism and for arranging the disassociated article in a predetermined position.

8. In an apparatus for arranging articles, a mechanism for advancing an article associated therewith, a member having a cam surface for engaging an advancing article, and a screw mechanism cooperating with said cam surface for disassociating an article from the advancing mechanism.

9. In an apparatus for arranging articles, a mechanism for advancing an article associated therewith, a cam for engaging an advancing article, and a mechanism having a spiral way cooperating with said cam for disassociating an article from the advancing mechanism.

10. In an apparatus for arranging articles, a screw mechanism for advancing articles associated therewith, and a means for raising associated articles into a predetermined position differing from the original position of association.

11. In an apparatus for arranging articles, a pair of parallel inclined screw mechanisms having spiral ways for advancing articles associated therewith, said screw mechanisms having a depressed portion thereon to permit improperly associated articles to be displaced by gravity.

12. In an apparatus for arranging articles, a screw mechanism having a spiral way for advancing articles associated therewith and extending transversely thereof, and a rotatable means for engaging with associated articles to maintain said articles in proper transverse position with respect to the axis of rotation of the screw mechanism during the advancement thereof.

13. In an apparatus for arranging articles, a screw mechanism having a spiral way for advancing articles associated therewith, means for disassociating articles associated therewith, and a rotatable means for engaging with associated articles to maintain said articles in proper position upon the screw mechanism with respect to the disassociating means during the advancement thereof.

14. In an apparatus for arranging an article, a screw mechanism having a spiral way for receiving and advancing articles in varied associated positions, rotary means adapted to select similarly positioned articles, and means cooperating with said rotary means to disassociate the selected articles from the spiral way.

15. In an apparatus for arranging elongated articles, a pair of screw mechanisms having oppositely disposed spiral ways for advancing elongated articles associated therewith in one of a number of predetermined transverse positions, a cam adapted to engage an end of an advancing article, and rotary means cooperating with said cam for disassociating similarly positioned articles from the screw mechanisms and for arranging the disassociated articles in proper predetermined positions.

16. In an apparatus for arranging elongated articles having a depressed portion, a screw mechanism having spiral ways for advancing articles associated therewith, said ways being designed to accommodate the depressed portion of the articles, a pair of oppositely rotatable members for engaging the end portions of and maintaining the articles in position upon the screw mechanism, and means for disassociating the advancing articles from the screw mechanism.

17. In an apparatus for arranging articles, a screw mechanism for arranging elongated articles associated therewith, a rotatable hopper for intermittently delivering elongated articles transversely of the screw mechanism, said hopper having a peripheral egress opening for the articles and adjustable means for varying the width of the opening.

18. In an apparatus for arranging articles, a screw mechanism for advancing an article associated therewith, a cam, and rotary means cooperating therewith for disassociating the article from the screw mechanism.

19. In an apparatus for arranging articles, a screw mechanism for advancing an article associated therewith, and means for swinging the article away from the screw mechanism into a disassociated position.

In witness whereof, we hereunto subscribe our names this 29th day of May, A. D. 1926.

CLEM H. FRANKS.
MARVIN ROY OLSEN.